(12) United States Patent
Park

(10) Patent No.: US 6,979,055 B2
(45) Date of Patent: Dec. 27, 2005

(54) SUNROOF FOR VEHICLE

(75) Inventor: Jeong-Hoon Park, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 10/749,226

(22) Filed: Dec. 30, 2003

(65) Prior Publication Data

US 2005/0082882 A1    Apr. 21, 2005

(30) Foreign Application Priority Data

Oct. 21, 2003 (KR) .................. 10-2003-0073389

(51) Int. Cl.⁷ ................................................. B60J 7/00
(52) U.S. Cl. ................................. 296/216.09; 296/217
(58) Field of Search ....................... 296/216.06–216.09, 296/217

(56) References Cited

U.S. PATENT DOCUMENTS

| | | | | |
|---|---|---|---|---|
| 4,553,307 A | * | 11/1985 | Kaltz et al. | 29/434 |
| 4,709,959 A | * | 12/1987 | Paerisch et al. | 296/217 |
| 5,484,184 A | * | 1/1996 | Kohlpaintner et al. | 296/217 |
| 2003/0085595 A1 | * | 5/2003 | Dunzinger et al. | 296/216.09 |

FOREIGN PATENT DOCUMENTS

| | | |
|---|---|---|
| JP | 2000-190735 | 7/2000 |
| KR | 2000-0004766 | 1/2000 |

* cited by examiner

*Primary Examiner*—Dennis H. Pedder
(74) *Attorney, Agent, or Firm*—Morgan Lewis & Bockius LLP

(57) ABSTRACT

The present invention is directed to an aesthetically improved lateral part of a sunroof for a vehicle configured to conceal an opening/closing mechanism from inside a vehicle to improve the external appearance and marketability. The invention is constructed so not to change prior-installed parts and designs. The sunroof comprises a guide rail frame mounted between a roof panel and a head liner, an opening/closing mechanism mounted at both lateral surfaces of the guide rail frame, a panel support rail for being opened and closed by the opening/closing mechanism, and a decoration cover coupled to a lateral surface of the support rail and for concealing the opening/closing mechanism. The decoration cover is formed in a predetermined length for coupling to a lateral surface of the glass support rail and has a predetermined height for concealing the opening/closing mechanism.

6 Claims, 4 Drawing Sheets

SUNROOF FOR VEHICLE

CROSS-REFERENCE TO RELATED APPLICATIONS

This application claims priority of Korean Application No. 10-2003-0073389, filed on Oct. 21, 2003, the disclosure of which is incorporated fully herein by reference.

FIELD OF THE INVENTION

The present invention relates to a sunroof for a vehicle and, more particularly, to an aesthetically improved lateral part of a sunroof for a vehicle.

BACKGROUND OF THE INVENTION

In general, a sunroof is an optional accessory item in a vehicle which enhances the driving pleasure of a driver or passengers and facilitates ventilation within the vehicle interior, unlike a window glass which functions to introduce sun light therethrough to brighten the interior of the vehicle.

The sunroof is designed to promote efficient ventilation for the interior of a vehicle. When a door window glass is opened to allow outside air to enter the interior of the vehicle, open windows may endanger the safety of the driver and the occupants by hampering the driver's ability to concentrate on the road because air may be directly blown toward the driver's face to allow dust or foreign objects to get into eyes of the driver. On the other hand, a sunroof allows outside air to enter the inside of the vehicle via a roof panel disposed at the roof of the vehicle, thus achieving balanced air circulation without impairing the driver's ability to drive safely and providing comfort and convenience to the occupants in the vehicle.

The sunroof thus described is largely classified into three types according to its method of operation, namely, a tilt-and-slide sunroof that slides open above the roof after tilt-up, an internal sliding sunroof that slides open between a roof outer panel and a roof inner panel, and a folding sunroof made of canvas that folds back as it slides open. Regardless of the different types, all of the sunroofs are mounted with an opening/closing mechanism for horizontally moving or lifting the sunroof.

However, there is a disadvantage with the known sunroofs, as described above, in that the opening/closing mechanism may be exposed along the lateral sides of the opened sunroof, thus diminishing the external appearance thereof, and also diminishing the marketability of the vehicle.

SUMMARY OF THE INVENTION

Embodiments of the present invention provide a sunroof of a vehicle configured to conceal the operating mechanism portion for opening and closing the sunroof from inside a vehicle to improve the external appearance and marketability, and constructed without change in prior-installed parts and designs for concealing the operating mechanism portion.

In accordance with a preferred embodiment of the present invention, a sunroof for a vehicle includes a sunroof frame mounted between a roof panel and a head liner, an opening/closing mechanism mounted at opposed lateral surfaces of the sunroof frame, a support rail capable of being opened and closed by the opening/closing mechanism, and a decoration cover coupled to a lateral surface of the support rail, wherein the decoration cover has a predetermined length and height for concealing the opening/closing mechanism. Preferably, the decoration cover comprises a body frame for covering a gap between the sunroof frame and the support rail to conceal the opening/closing mechanism, and at least one fixation part connected to the body frame for attaching the body frame onto a lateral surface of the support rail.

In accordance with another preferred embodiment of the present invention, a decorative cover for concealing an opening/closing mechanism located between a sunroof frame and a panel support rail in a vehicle includes a body frame having a predetermined length and height for concealing the opening/closing mechanism, and at least one fixation part for connecting the body frame onto a lateral surface of the panel support rail. The at least one fixation part may include a first fixation part configured to snap onto a lateral surface of the panel support rail. The at least one fixation part may additionally or alternatively include a second fixation part including upper and lower clips spaced apart to receive a lateral surface of the panel support rail.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

The preferred embodiments of the present invention will now be described in detail with reference to the annexed drawings.

Figure 1:
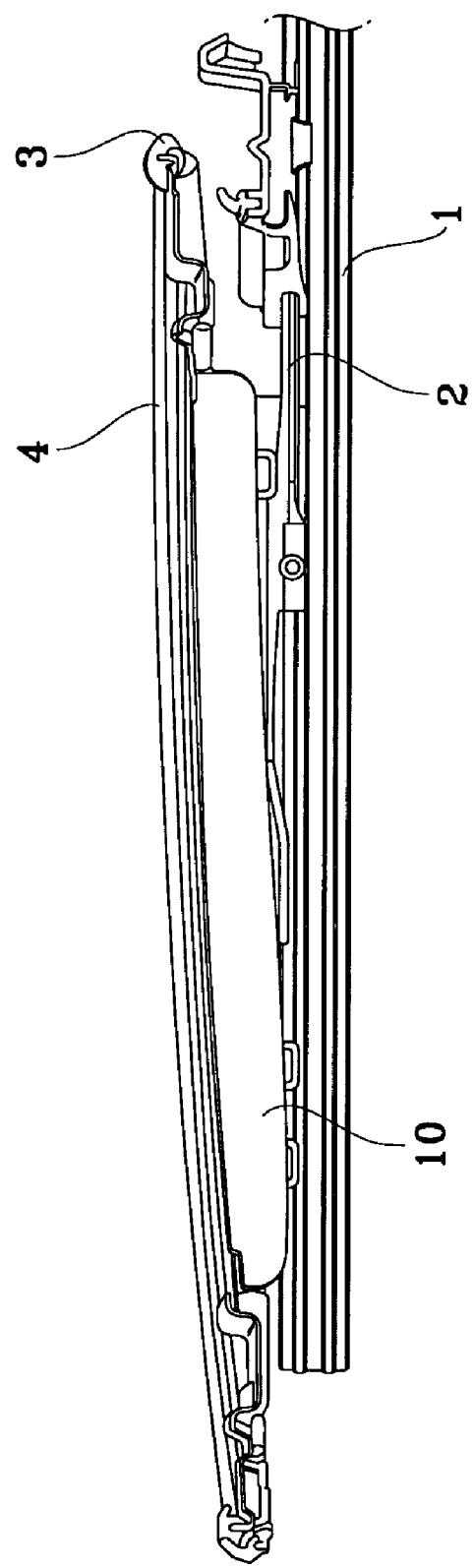
FIG. 1 is a side view of a sunroof for a vehicle according to an embodiment of the present invention.
Figure 2:
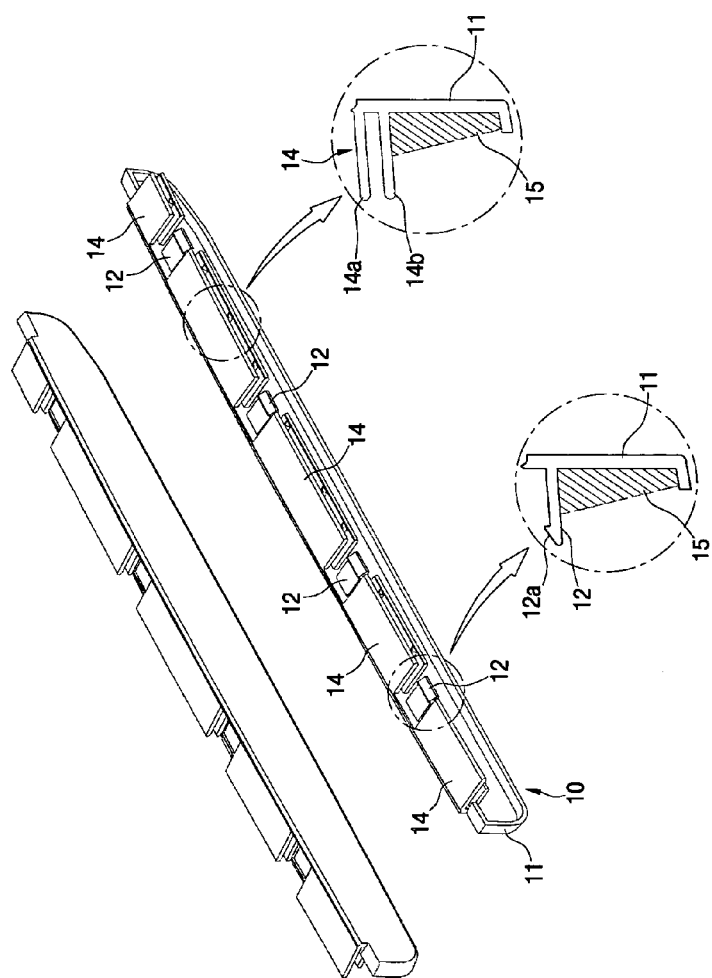
FIG. 2 is a cross-sectional view of a sunroof mechanism concealed by a decoration according to an embodiment of the present invention.

As shown in FIGS. 1 and 2, a sunroof for a vehicle in accordance with an embodiment of the present invention includes a guide rail frame 1 (also known as a "sunroof frame") mounted between a roof panel R (shown in FIG. 3) and a head liner, a sun shade 2 disposed at an opening of the guide rail frame 1 for diminishing the intensity of ultraviolet sunrays, an openable and closeable support rail 3 attached with the sunroof panel 4, an opening/closing mechanism 5 (shown in FIGS. 3 and 4) mounted at a lateral surface of the guide rail frame 1 for opening and closing the support rail 3 along the guide rail frame 1, and a decoration cover 10 coupled along a lateral surface of the support rail 3 for concealing the opening/closing mechanism 5. The sunroof panel 4 is preferably made of transparent or semi-transparent material, such as glass, for diminishing the intensity of sunrays into a vehicle.

Figure 3:
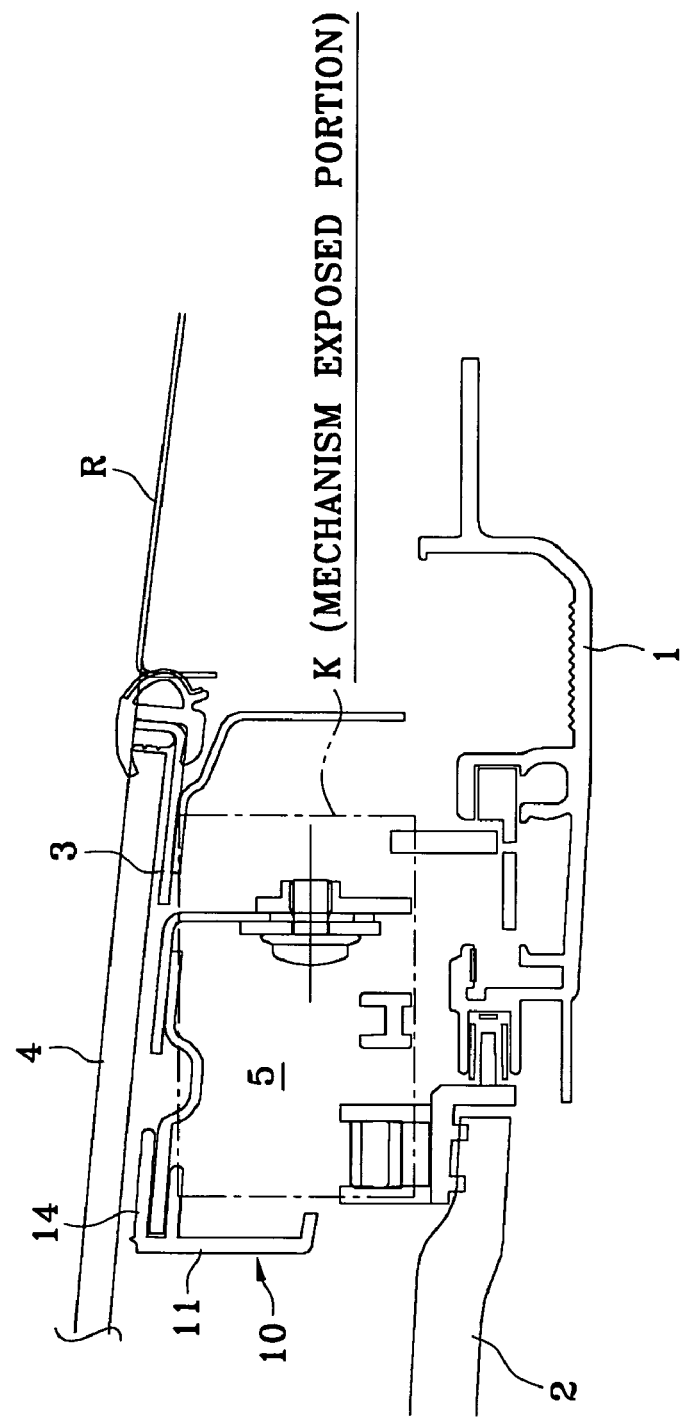
FIG. 3 is a side view of a decoration cover according to an embodiment of the present invention.
Figure 4:
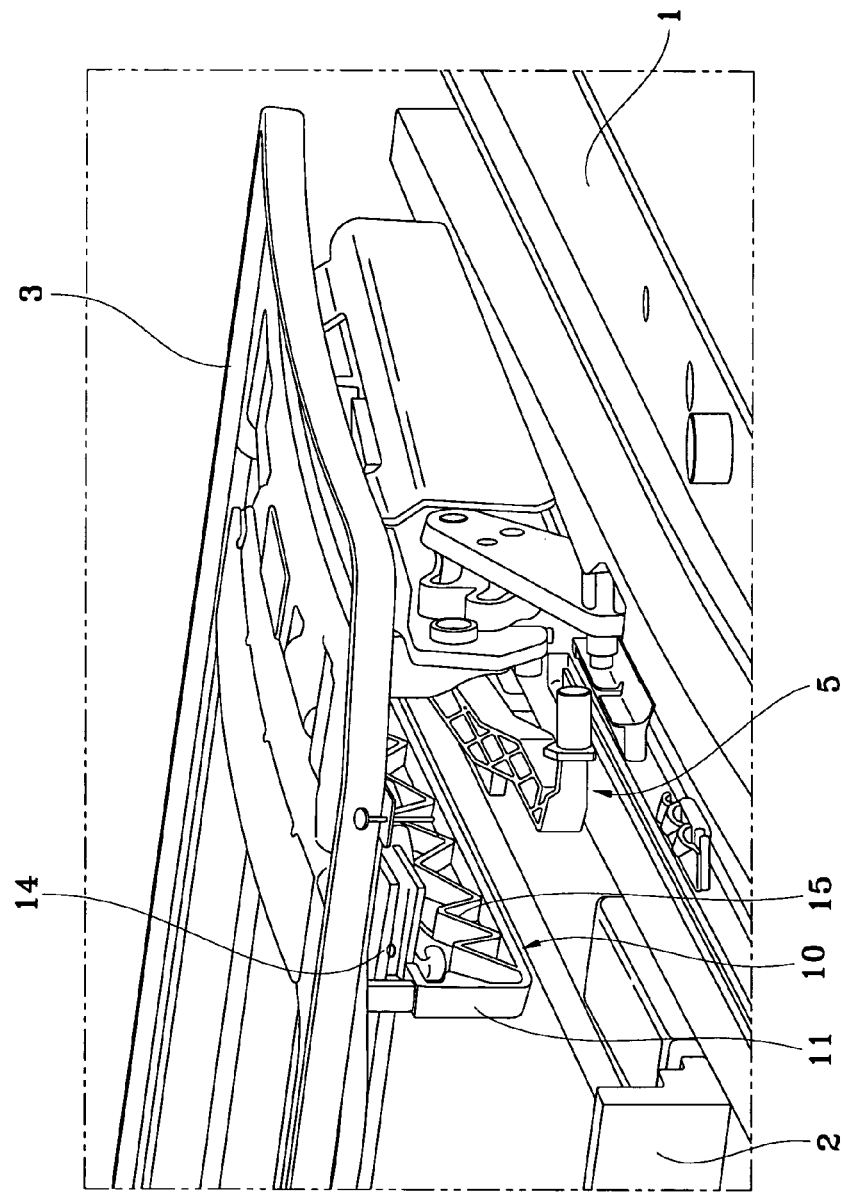
FIG. 4 is a perspective view of a decoration cover according to an alternative embodiment of the present invention.

It should be apparent that the opening/closing mechanism 5, as illustrated in FIGS. 3 and 4, may generally comprise a plurality of links operated by a motor and may be mounted at both lateral surfaces of the guide rail frame 1. Opening/closing mechanism 5 serves to slide the support rail 3 back and forth along the guide rail frame 1.

As depicted in FIG. 2, the decoration cover 10 is formed in a predetermined length for being coupled to a lateral surface of the support rail 3, and as illustrated in FIG. 3, has an approximately "L" shaped cross-section in order to possess a predetermined height for concealing the opening/closing mechanism 5 mounted between the guide rail frame 1 and the support rail 3.

In other words, the decoration cover 10 includes a body frame 11 for covering a space between the guide rail frame 1 and the support rail 3 so that the opening/closing mechanism 5 is not exposed. Decorative cover 10 may also include a first fixation part 12 (shown in FIG. 2) and a second fixation part 14 (shown in FIGS. 2, 3 and 4) formed on the body frame 11 for being inserted into a lateral surface of the support rail 3, and ribs 15 each connected at a distal end of the body frame 11 towards the first and second fixation parts 12 and 14.

Referring to FIG. 2, the first fixation part 12 extends out from an upper portion of the body frame 11 for being inserted into the lateral surface of the support rail 3 and snapped thereto, and may be formed with a snap connector 12a, which may have a barb at its distal end. The second fixation part 14 may be formed with upper and lower clips 14a and 14b extending out from an upper portion of the body frame 11, and may define a space therebetween for receiving a lateral surface of the support rail 3. The fixation part 12 and the second fixation part 14 may be formed near one another.

Referring to FIG. 4, one preferred embodiment of decoration cover 10 is shown, in which the cover 10 has a different shape. The appearance of the lateral part of the sunroof may be further enhanced by forming a wavy shape along a longitudinal direction inside the body frame 11. For example, body frame 11 may be formed with only a margin or border and rib 15. Rib 15 may be formed in a wavy shape, as shown.

The operation of the present invention will now be described with reference to the accompanying drawings.

As shown in FIG. 1, the decoration cover 10 serves to conceal the opening/closing mechanism 5 and consequently improve the external appearance of the sunroof. This can be easily accomplished by inserting the decoration cover 10, which may be separately manufactured, onto the lateral surface of the support rail 3 of the sunroof. In other words, when the decoration cover 10 is inserted onto the lateral surface of the support rail 3, the first fixation part 12 of the decoration cover 10 may be inserted and snapped onto the lateral surface of the support rail 3 via the barb-shaped snap connector 12a formed towards the distal end thereof. It should also be apparent that the first fixation part 12 is so formed as to make use of the space in relation to the shape and structure of the support rail 3, and is easily snapped or fixed thereto.

In addition, the second fixation part 14 along with the first fixation part 12 of the decoration cover 10 is simply coupled to (e.g., slid over) the lateral surface of the support rail 3. In other words, as illustrated in FIG. 3, when the lateral surface of the support rail 3 is inserted into a gap formed by upper and lower clips 14a and 14b of the second fixation part 14, a fixation force is naturally generated to allow the fixation parts 12 and 14 to be coupled thereafter.

It should be also noted that the simple job of inserting the first and second fixation parts 12 and 14 of the decoration cover 10 onto the lateral surface of the support rail 3 can conceal the opening/closing mechanism 5 mounted between the guide rail frame 1 and the support rail 3.

In addition, if a portion of the rib 15 of the decoration cover 10 is modified, the external appearance thereof can be further enhanced. For example, as shown in FIG. 2, the frame 11 may be formed with only a margin or border with ribs 15 interconnected inside the margin or border, forming a wavy shape, and further enhancing the appearance of the lateral part of the sunroof, as shown in FIG. 4.

As is apparent from the foregoing, there is an advantage in the aesthetically improved sunroof of a vehicle according to the present invention, in that one or both lateral surfaces between the guide rail frame and support rail (where the opening/closing mechanism is exposed) may be concealed by a decoration cover to prevent the external appearance from being deteriorated by the opening/closing mechanism being exposed after operation, and to provide an enhanced decorational effect to the decoration cover, thereby improving the marketability of the sunroof.

There is another advantage in that a decoration cover according to the present invention may be separately manufactured and retrofitted on previously existing sunroofs, without the need to alter the parts and/or designs of the pre-existing sunroofs.

What is claimed is:

1. A sunroof for a vehicle, comprising:
 a sunroof frame mounted between a roof panel and a head liner;
 an opening/closing mechanism mounted at opposed lateral surfaces of said sunroof frame;
 a support rail capable of being opened and closed by said opening/closing mechanism; and
 a decoration cover coupled to a lateral surface of said support rail, wherein said decoration cover has a predetermined length and height for concealing said opening/closing mechanism, and comprises:
 a body frame for covering a gap between said sunroof frame and said support rail to conceal said opening/closing mechanism; and
 at least one fixation part connected to said body frame for attaching said body frame onto a lateral surface of said support rail, wherein said body frame includes a border, and said rib is formed inside a border and is wavy.

2. The sunroof of claim 1, wherein said at least one fixation part includes a first fixation part extending out from an upper portion of said body frame for being inserted onto the lateral surface of said support rail.

3. The sunroof of claim 2, wherein said first fixation part is configured to snap onto the lateral surface of said support rail.

4. The sunroof of claim 3, wherein said first fixation part includes a snap connector having a barb.

5. The sunroof of claim 1, wherein said at least one fixation part includes a second fixation part formed with upper and lower clips extending out from an upper portion of said body frame for receiving a lateral surface of said support rail.

6. The sunroof of claim 1, wherein said at least one fixation part includes a first fixation part located adjacent a second fixation part.

* * * * *

UNITED STATES PATENT AND TRADEMARK OFFICE
CERTIFICATE OF CORRECTION

| | | |
|---|---|---|
| PATENT NO. | : 6,979,055 B2 | Page 1 of 1 |
| APPLICATION NO. | : 10/749226 | |
| DATED | : December 27, 2005 | |
| INVENTOR(S) | : Jeong-Hoon Park | |

It is certified that error appears in the above-identified patent and that said Letters Patent is hereby corrected as shown below:

On the front page:

Left column, Item (73) Assignee "Hyundai Motor Company" should be changed to --Kia Motors Corporation--.

Signed and Sealed this

Sixth Day of March, 2007

JON W. DUDAS
*Director of the United States Patent and Trademark Office*